C. WEITMAN.
Tire Shrinking Device.
No. 51,636. Patented Dec. 19, 1865.
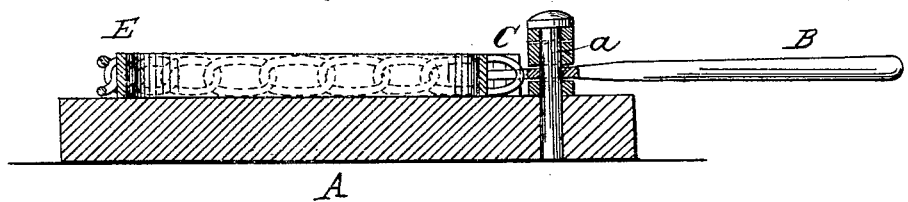
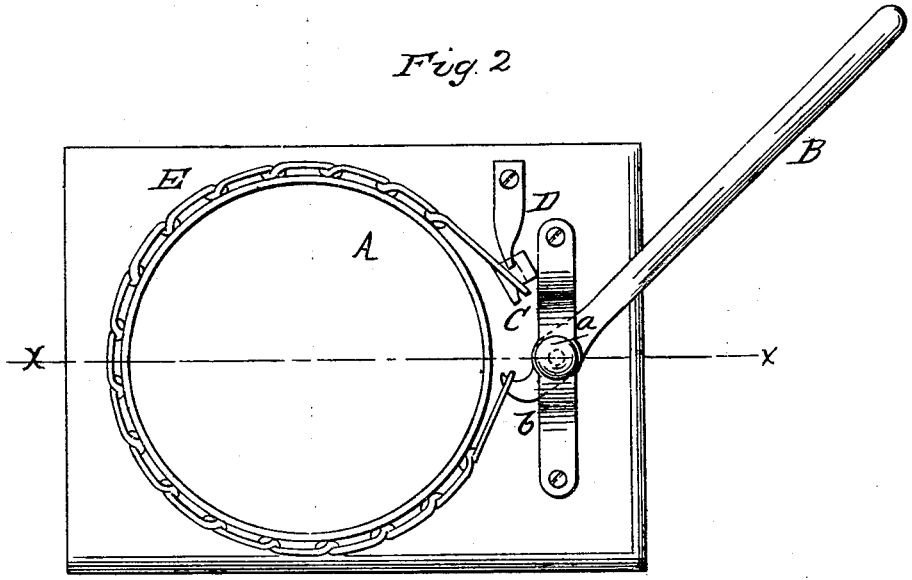

UNITED STATES PATENT OFFICE.

C. WEITMAN, OF HAZELTON, IOWA.

IMPROVED DEVICE FOR SHRINKING TIRE.

Specification forming part of Letters Patent No. 51,636, dated December 19, 1865.

*To all whom it may concern:*

Be it known that I, C. WEITMAN, of Hazelton, in the county of Buchanan and State of Iowa, have invented a new and useful Improvement in a Device for Shrinking Tires and other Metal Bands; and I do hereby declare that the following is a full, clear, and exact description thereof, which will enable those skilled in the art to make and use the same, reference being had to the accompanying drawings, forming part of this specification.

Figure 1 is a vertical section of my invention, taken in the line $x\ x$, Fig. 2; Fig. 2, a plan or top view of the same.

Similar letters of reference indicate corresponding parts.

This invention consists in the employment or use of a lever, hook, and a chain arranged with a suitable bed-piece in such a manner that tires for wheels and other metal bands may be contracted or diminished in diameter without cutting and rewelding them and the work performed expeditiously and by a uniform contraction throughout the whole circumference of the tire or band, thereby avoiding the increased thickness now caused at particular parts owing to the contraction or upsetting being confined at a particular place.

A represents a bed-piece, on which a lever, B, is secured by a pivot or fulcrum bolt, $a$, said lever being of any suitable length and having a hook, $b$, formed at its inner end, as shown clearly in Fig. 2.

C is a hook, which is fitted on an arm, D, on the bed-piece about in a line with the hook $b$ of the lever when said lever is parallel with the ends of the bed-piece.

E is a chain, the link at one end of which is fitted on the hook $b$ of the lever B, the link at the opposite end being fitted on the hook C.

The tire or metal band to be contracted, upset, or shrunk is properly heated and placed on the bed-piece A, the chain E placed around it, and its end links connected to the lever and hook, as previously described. The lever B is then actuated and the chain E made thereby to act upon and contract or shrink the tire or band.

The operation is quickly performed, the device composed of but few parts, cheaply constructed, and not liable to get out of repair.

I am aware that it is not new to employ a lever and chain for shrinking tires; but

I claim as new and desire to secure by Letters Patent—

The combination of the hooked lever B $b$, hook C, arm D, chain E, bed-plate A, and fulcrum $a$, all constructed, arranged, and employed in the manner and for the purposes herein set forth.

C. WEITMAN.

Witnesses:
JAMES M. WEST,
JAMES JAMISON.